(12) United States Patent
Kurotobi et al.

(10) Patent No.: US 11,526,173 B2
(45) Date of Patent: Dec. 13, 2022

(54) TRAVELING TRAJECTORY CORRECTION METHOD, TRAVELING CONTROL METHOD, AND TRAVELING TRAJECTORY CORRECTION DEVICE

(71) Applicant: Nissan Motor Co., Ltd., Yokohama (JP)

(72) Inventors: Tomoko Kurotobi, Kanagawa (JP); Satoshi Tange, Kanagawa (JP); Masafumi Tsuji, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 29 days.

(21) Appl. No.: 17/264,070

(22) PCT Filed: Aug. 3, 2018

(86) PCT No.: PCT/IB2018/000988
§ 371 (c)(1),
(2) Date: Jan. 28, 2021

(87) PCT Pub. No.: WO2020/025991
PCT Pub. Date: Feb. 6, 2020

(65) Prior Publication Data
US 2021/0349463 A1 Nov. 11, 2021

(51) Int. Cl.
*G05D 1/02* (2020.01)

(52) U.S. Cl.
CPC ......... *G05D 1/0214* (2013.01); *G05D 1/0223* (2013.01); *G05D 1/0268* (2013.01); *G05D 1/0289* (2013.01); *G05D 2201/0213* (2013.01)

(58) Field of Classification Search
CPC .. G05D 1/0214; G05D 1/0223; G05D 1/0268; G05D 1/0289; G05D 2201/0213;
(Continued)

(56) References Cited

U.S. PATENT DOCUMENTS

| 9,555,803 B2 * | 1/2017 | Pawlicki | G08G 1/16 |
| 2014/0180543 A1 * | 6/2014 | Ueda | B62D 15/025 |
| | | | 701/41 |

(Continued)

FOREIGN PATENT DOCUMENTS

| JP | 2016-071566 A | 5/2016 |
| WO | 2014/006759 A1 | 1/2014 |

(Continued)

*Primary Examiner* — Rodney A Butler
(74) *Attorney, Agent, or Firm* — Young Basile Hanlon & MacFarlane, P.C.

(57) ABSTRACT

A method for correcting a travelling trajectory of a vehicle which is executed by a processor includes: generating a subject vehicle travelling route that a subject vehicle travels based on map information stored in a database; calculating a travelling trajectory of the subject vehicle to be a target trajectory when the subject vehicle travels on the subject vehicle travelling route; detecting a position of another vehicle travelling on a lane located in a width direction of the subject vehicle by a sensor provided for the subject vehicle; calculating an offset of a position of the other vehicle in another vehicle lane that the other vehicle travels based on the position of the other vehicle; and correcting the travelling trajectory of the subject vehicle in accordance with the offset.

17 Claims, 7 Drawing Sheets

(58) Field of Classification Search
CPC ....... B60W 2754/20; B60W 30/18145; B60W 30/18159; B60W 60/001; B60W 2552/10; B60W 2552/30; B60W 2556/40; B60W 2556/50

See application file for complete search history.

(56) References Cited

U.S. PATENT DOCUMENTS

| | | |
|---|---|---|
| 2015/0134204 A1 | 5/2015 | Kunihiro et al. |
| 2017/0236422 A1 | 8/2017 | Naka et al. |
| 2017/0267237 A1* | 9/2017 | Oyama ................ B60W 10/18 |
| 2019/0031193 A1 | 1/2019 | Kojima |

FOREIGN PATENT DOCUMENTS

| | | |
|---|---|---|
| WO | 2017/047261 A1 | 3/2017 |
| WO | 2017/169021 A1 | 10/2017 |

* cited by examiner

TRAVELING TRAJECTORY CORRECTION METHOD, TRAVELING CONTROL METHOD, AND TRAVELING TRAJECTORY CORRECTION DEVICE

TECHNICAL FIELD

The present invention relates to a travelling trajectory correcting method for correcting a travelling trajectory of a vehicle, a travel controlling method for controlling travel of the vehicle, and a device for correcting the travelling trajectory.

BACKGROUND

A device for controlling travel of a vehicle is known in which lane shape information included in map information is acquired; information on a lane shape around the vehicle is obtained based on image information obtained by camera; travelling trajectories of vehicles around are calculated; the acquired lane shape and travelling trajectory shape of the vehicles around are compared and calculated; a lane shape with a degree of similarity greater than a predetermined level is selected; and a path is corrected when the selected lane shape does not correspond to the current target path (for example, WO2017/169021A).

SUMMARY

However, in the above prior art, when a segment line of lanes is not drawn on a road, for example in an intersection, since it is impossible to detect a lane shape from the captured image of camera, there is a problem that a travelling trajectory cannot be corrected.

The problem to be solved by the present invention is to provide a method for correcting a travelling trajectory, a method for controlling travel, and a device for correcting the travelling trajectory in circumstances when the segment line is not provided on the road or when the segment line is not properly detected.

The present invention solves the above-mentioned problem by: generating a subject vehicle travelling route based on map information; calculating a travelling trajectory of a subject vehicle which becomes a target trajectory when the subject vehicle travels on the subject vehicle travelling route; detecting a position of another vehicle traveling on a lane which is located in a width direction of the subject vehicle by a sensor; calculating an offset of the position of the other vehicle within lane where the other vehicle travels based on the position of the other vehicle; and correcting the travelling trajectory of the subject vehicle in accordance with the calculated offset.

According to the present invention, the travelling trajectory of the subject vehicle can be corrected in circumstances when the segment line is not provided on the road or when the segment line cannot be properly detected.

DETAILED DESCRIPTION

Hereinafter, a travel controlling device (a travelling trajectory correcting device) for a vehicle and a method thereof according to an embodiment of the present invention will be explained with reference to the drawings. Incidentally, in the present embodiment, the present invention will be described by exemplifying a travel controlling device mounted on a vehicle.

First Embodiment

Figure 1:
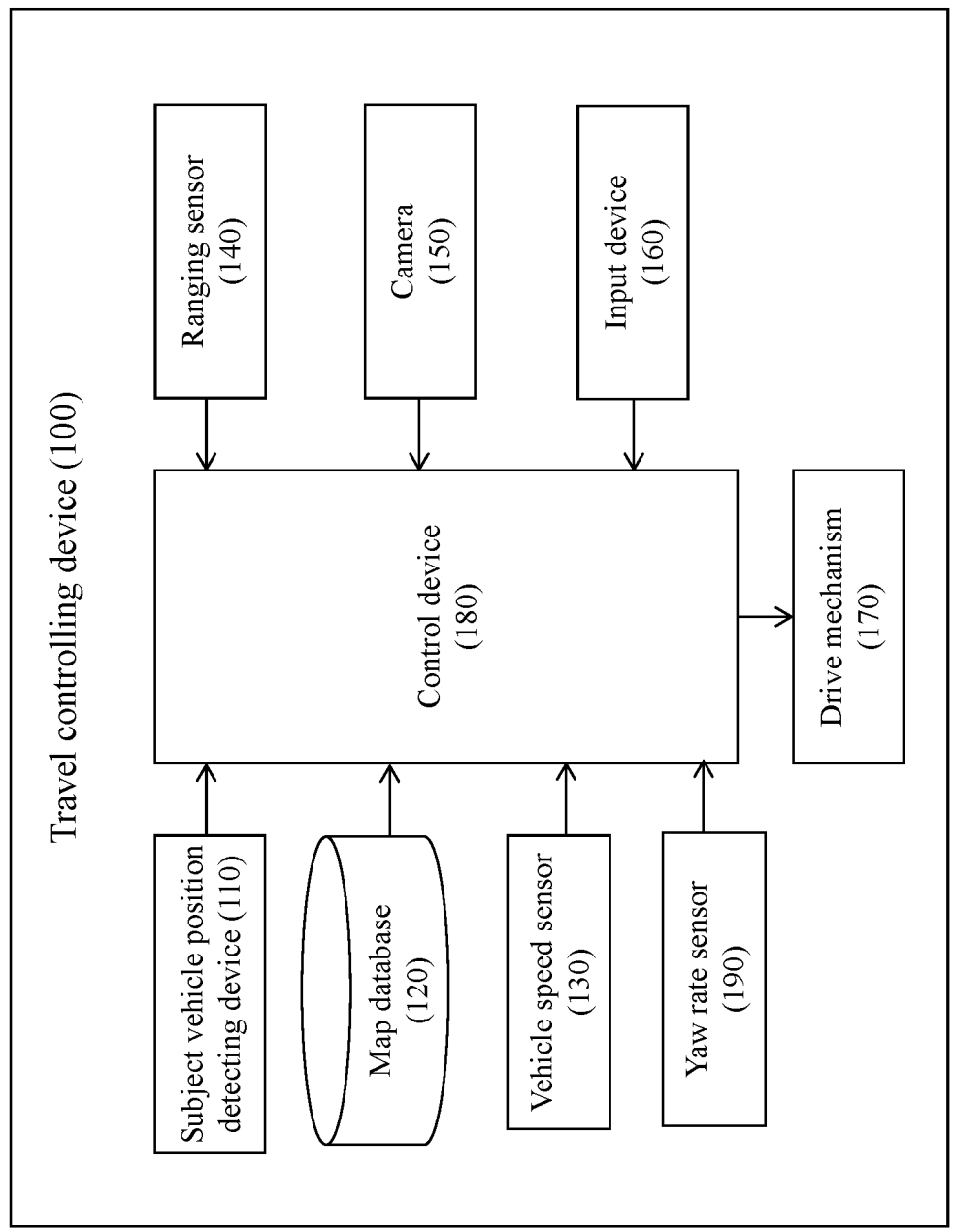
FIG. 1 is a block diagram illustrating a travel controlling device according to an embodiment of the present invention.

FIG. 1 is a diagram illustrating a configuration of a travel controlling device 100 of a vehicle according to an embodiment of the present invention. As shown in FIG. 1, the travel controlling device 100 according to the present embodiment comprises a subject vehicle position detecting device 110, a map database 120, a vehicle speed sensor 130, a ranging sensor 140, a camera 150, a drive mechanism 170, a control device 180, and a yaw rate sensor 190. These components are connected to one another via a controller area network (CAN) or other in-vehicle LAN for mutually exchanging information.

The subject vehicle position detecting device 110 comprises a GPS unit that detects radio waves transmitted from a plurality of satellite communications by a locator (a GPS antenna) to periodically acquire positional information of the subject vehicle, and also detects the current position of the subject vehicle based on the acquired positional information of the subject vehicle, angle change information acquired from a gyro sensor, and a vehicle speed acquired from the vehicle speed sensor. The subject vehicle position detection device 110 may detect the position of the subject vehicle by using a well-known map matching technique.

The map database 120 contains map information. In map information stored in the map database 120, information of road shapes in respective map coordinates, for example, attributes relating to curves, slopes, intersections, interchanges, narrow roads, straight roads, road shoulder structures, and merge points are recorded in association with map coordinates. Map information includes a lane boundary line (a track boundary) information and a center line of a travelling region (a center line of a lane) information as information about a travelling route. The travelling route shows the entire lane sandwiched between the lane boundary lines. If a lane is drawn on the road, lane boundary line information represents a position of the lane on the road. For example, in a region where lane is not drawn on the road surface, such as at an intersection, lane boundary line data indicates a hypothetical lane boundary line after identifying the driving course of the vehicle. For example, at an intersection where a vehicle can turn left, turn right, and go straight-ahead, the lane boundary line shows a boundary of a track for left-turn, a boundary of a track for right-turn, and a boundary of track for straight-ahead, respectively, so as to connect the entrance (the entrance of the vehicle) and the exit (the exit of the vehicle) of the intersection. Incidentally, the lane boundary line does not need to indicate the boundaries of the tracks corresponding to all the traveling routes within the intersection. The information on the travelling route may include information on the center line of the travelling region instead of the travelling route. The center line of the travelling region corresponds to a center line between the left-side lane boundary line and the right-side lane boundary line in the width direction of the vehicle. Further, the travelling route may include both the boundary lines of the travelling route and the center line of the travelling region. The map information is a high-precision map used for autonomous driving control of vehicles.

The vehicle speed sensor 130 measures a rotational speed of a drive system, such as a drive shaft, and detects a traveling speed of the subject vehicle (hereinafter, also referred to as a vehicle speed) based on the measured rotational speed. The vehicle speed of the subject vehicle detected by the vehicle speed sensor 130 is outputted to the control device 180. The yaw rate sensor 190 is mounted in an appropriate place in a vehicle interior and detects a yaw rate of the subject vehicle (a change rate of a rotation angle in a turning direction). Detected yaw rate information of the subject vehicle is outputted to the control device 180.

The ranging sensor 140 detects objects present around the subject vehicle. Further, the ranging sensor 140 calculates a relative distance and a relative velocity between the subject vehicle and the object. Information of the object detected by the ranging sensor 140 is transmitted to the control device 180. The ranging sensor 140 includes LRFs, such as a laser radar, a millimeter-wave radar, and the like.

The camera 150 captures the roads and objects around the subject vehicle. In this embodiment, the camera 150 images the front of the subject vehicle. Image information captured by the camera 150 is transmitted to the control device 180. The camera 150 is a camera for imaging the front of the subject vehicle and/or a camera for imaging the side of the subject vehicle. Incidentally, the travel controlling device 100 may include a radar or a lidar in addition to the ranging sensor 140 and camera 150 to detect conditions around the subject vehicle.

The input device 160 is an operating member that can be operated by a driver. In the present embodiment, the driver sets an on/off of autonomous drive control by operating the input device 160. In the autonomous drive control of vehicles according to the present embodiment, when a preceding vehicle exists in front of the subject vehicle, a vehicle-to-vehicle distance control (a preceding vehicle following control) is performed for the subject vehicle travelling so that a vehicle-to-vehicle distance between the subject vehicle and the preceding vehicle is maintained at the vehicle-to-vehicle distance set by the driver, and the subject vehicle follows the preceding vehicle. When a preceding vehicle does not exist in front of the subject vehicle, a speed control is performed for the subject vehicle travelling at a vehicle speed set by the driver. In the present embodiment, the driver operates the input device 160 thereby to set a set vehicle speed of the subject vehicle (for example, a specific speed value) in the speed control and a set vehicle-to-vehicle distance in the vehicle-to-vehicle distance control (for example, any one of the three stages of a short distance, a medium distance and a long distance).

The drive mechanism 170 includes engines and/or motors (power systems), brakes (braking systems), and steering actuators (steering systems), etc., for autonomous driving of the subject vehicle. In the present embodiment, when the autonomous driving control to be described later is performed, working of the drive mechanism 170 is controlled by the control device 180.

The control device 180 is a computer having a processor and comprises a ROM (Read Only Memory) that stores a program for controlling the travelling of the subject vehicle, a CPU (Central Processing Unit) that executes a program stored in the ROM, and a RAM (Random Access Memory) that functions as an accessible storage device. Incidentally, as an operation circuit, a micro processing unit (MPU), a digital signal processor (DSP), an application specific integrated circuit (ASIC), a field programmable gate array (FPGA) and the like can be used as substitute for or in addition to the CPU.

The control device 180 executes the programs stored in the ROM, thereby realizing: a subject vehicle travelling route generating function for generating the travelling route of the subject vehicle; another vehicle lane identifying function for identifying a lane of the other vehicle; a offset calculation function; a travelling trajectory generating (calculating) and correcting function; and a travel controlling function (including an autonomous following function) for controlling the travel of the subject vehicle. In the following, each of the functions provided by the control device 180 is explained. Incidentally, in addition to the functions described below, the control device 180 has other functions such as an detecting function for detecting a position of the subject vehicle.

The control device 180 calculates the subject vehicle travelling route based on the position of the subject vehicle and the map information by the subject vehicle travelling route generating function. The travel route of the subject vehicle is represented by a center line of a lane, a lane boundary line (a track boundary), and/or a travelling region. The control device 180 estimates the position of the subject vehicle on the map based on positional information of the subject vehicle detected by the subject vehicle position detecting device 110 and the map information. Incidentally, the control device 180 may calculate the subject vehicle travelling route by using the captured image of the camera 150. For example, the control device 180 detects a lane from the lateral and/or forward captured images of the subject vehicle. The control device 180 may generate subject vehicle travelling route by identifying a detected border as the lane boundary line.

The control device 180 detects the position of the other vehicle by the other vehicle lane identifying function to identify the lane that the other vehicle is travelling. The control device 180 uses the ranging sensor 140 and/or the camera 150 to detect the position of the other vehicle present around the subject vehicle. The control device 180 uses the map information to identify lanes around the subject vehicle. The control device 180 calculates the position of the other vehicle on the map by using a detection result of the detected other vehicle and identifies the lane belonging to the current position of the other vehicle. For example, the control device 180 periodically detects the positional information of the other vehicle and calculates a trajectory of the detected position as the travelling trajectory of the other vehicle. The control device 180 then identifies the lanes located around the subject vehicle from lane boundary line data included in the map information. When the calculated travelling route of the other vehicle is sandwiched between the lane boundary lines, the control device 180 identifies the lane to which the other vehicle belongs from the lane boundary lines sandwiching the travelling trajectory of the other vehicle. Incidentally, when identifying the other vehicle lane, calculating the traveling route of the other vehicle is not necessarily required. For example, the control device 180 detects the position of the other vehicle by using the ranging sensor 140 and/or the camera 150 and extracts a lane located around the subject vehicle from the map information. The control device 180 identifies a lane to which the position of the detected other vehicle belongs as the other vehicle lane from the extracted lanes.

The control device 180 calculates an offset of the position of the other vehicle within the lane of the other vehicle travelling route by the offset calculation function. The offset of the position of the other vehicle (hereafter simply referred to as "offset") represents misalignment of the other vehicle in a vehicle-width direction with respect to the center line of the lane. For example, when the current position of the other vehicle is near the center line of the vehicle, the offset is reduced. On the other hand, when the current position of the other vehicle is located on the lane boundary line side that is the right side of the center line of the lane, the offset increases on the right side in the vehicle width direction. The offset of the other vehicle corresponds to deviation (misalignment) of the other vehicle in the direction of the vehicle's width with respect to the lane boundary line. The control device 180 calculates a deviation (difference) in the vehicle width direction between the calculated travelling trajectory of the other vehicle and the center line or the lane boundary line of the lane to which the other vehicle belongs as the offset of the other vehicle.

By the travelling trajectory generating and correcting function, the control device 180 calculates the travelling trajectory of the subject vehicle which becomes the target trajectory when the subject vehicle travels on the subject vehicle travelling route, and corrects the travelling trajectory of the subject vehicle within the lane of the subject vehicle travelling route in accordance with the calculated offset. When the position of the other vehicle position is not offset toward the subject vehicle, for example, the control device 180 sets (calculates) the travelling trajectory at the center between the lane boundary lines indicating the subject vehicle travelling route. The control device 180, on the other hand, corrects the travelling trajectory of the subject vehicle so that the travelling trajectory of the subject vehicle is away from the travelling trajectory of the other vehicle when the position of the other vehicle is offset toward the subject vehicle so that the other vehicle approaches the subject vehicle while the other vehicle is traveling in the adjacent lane of the subject vehicle.

By controlling the drive mechanism 170 with the travel controlling function, the control device 180 executes an autonomous driving control that autonomously performs all or a part of travel of the subject vehicle so that the subject vehicle travels on the target travelling trajectory. When the travelling trajectory is corrected by the travelling trajectory generating and correcting function, the target trajectory when the subject vehicle travels is the corrected travelling trajectory. For example, the control device 180 controls the steering actuator and the like of the subject vehicle so that the subject vehicle travels along the calculated travelling trajectory by the travel controlling function. In addition, the control device 180 controls the working of the drive mechanism 170 such as the engine, brake, and steering actuator when a preceding vehicle exists in front of the subject vehicle, so that the vehicle-to-vehicle distance between the subject vehicle and the preceding vehicle are set to the vehicle-to-vehicle distance set by the vehicle-to-vehicle distance setting function, and the subject vehicle travels to follow the travelling trajectory traveled by the preceding vehicle. Further, the control device 180 controls the working of the drive mechanism 170, such as the engine or braking, to execute the travel control that makes the subject vehicle to travel at a predetermined set speed set by the driver. Incidentally, the autonomous driving control by the travel controlling function is performed in compliance with the traffic laws and regulations of each country.

Figure 2:
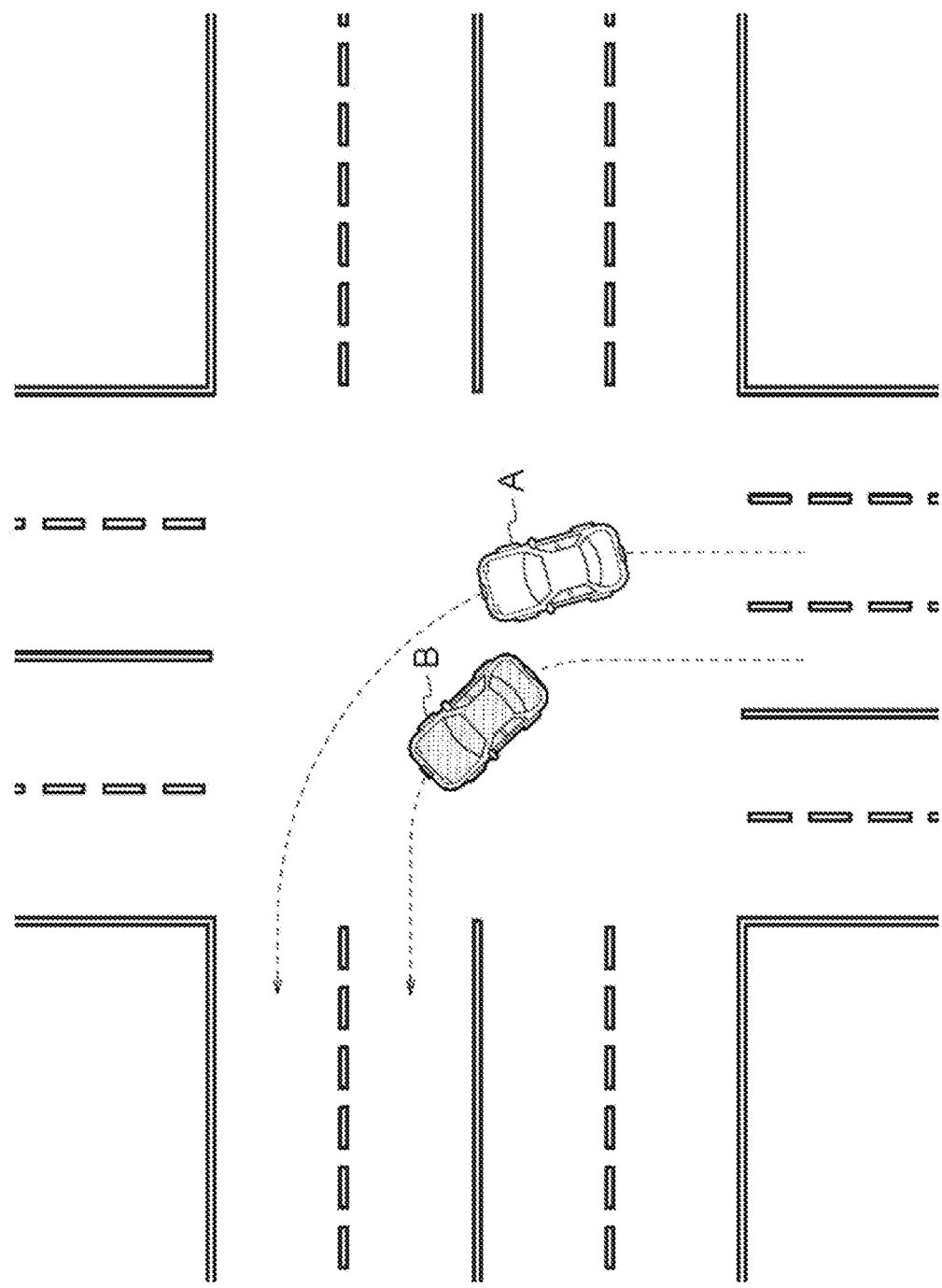
FIG. 2 is a diagram illustrating an example of a scene in which the control process according to the present invention is executed.

Next, a control process for assisting the traveling of the vehicle is described. FIG. 2 is a diagram illustrating an example of a scene in which the control process according to the present embodiment is executed. A traffic circumstance in which a vehicle passes on the right side is described as an example. In FIG. 2, "A" represents the subject vehicle and "B" represents the other vehicle. As shown in FIG. 2, in the intersection, the lane boundary line is not drawn on the road with a solid line or the like, and the lane boundary line cannot be identified by the driver's visual inspection or sensing by camera and the like. In the example of FIG. 2, the subject vehicle turns such an intersection left, and the other vehicle travels side-by-side with the subject vehicle on the left side of the subject vehicle and turns the intersection left likewise the subject vehicle. At this time, the other vehicle travels approaching toward the subject vehicle.

Figure 3:
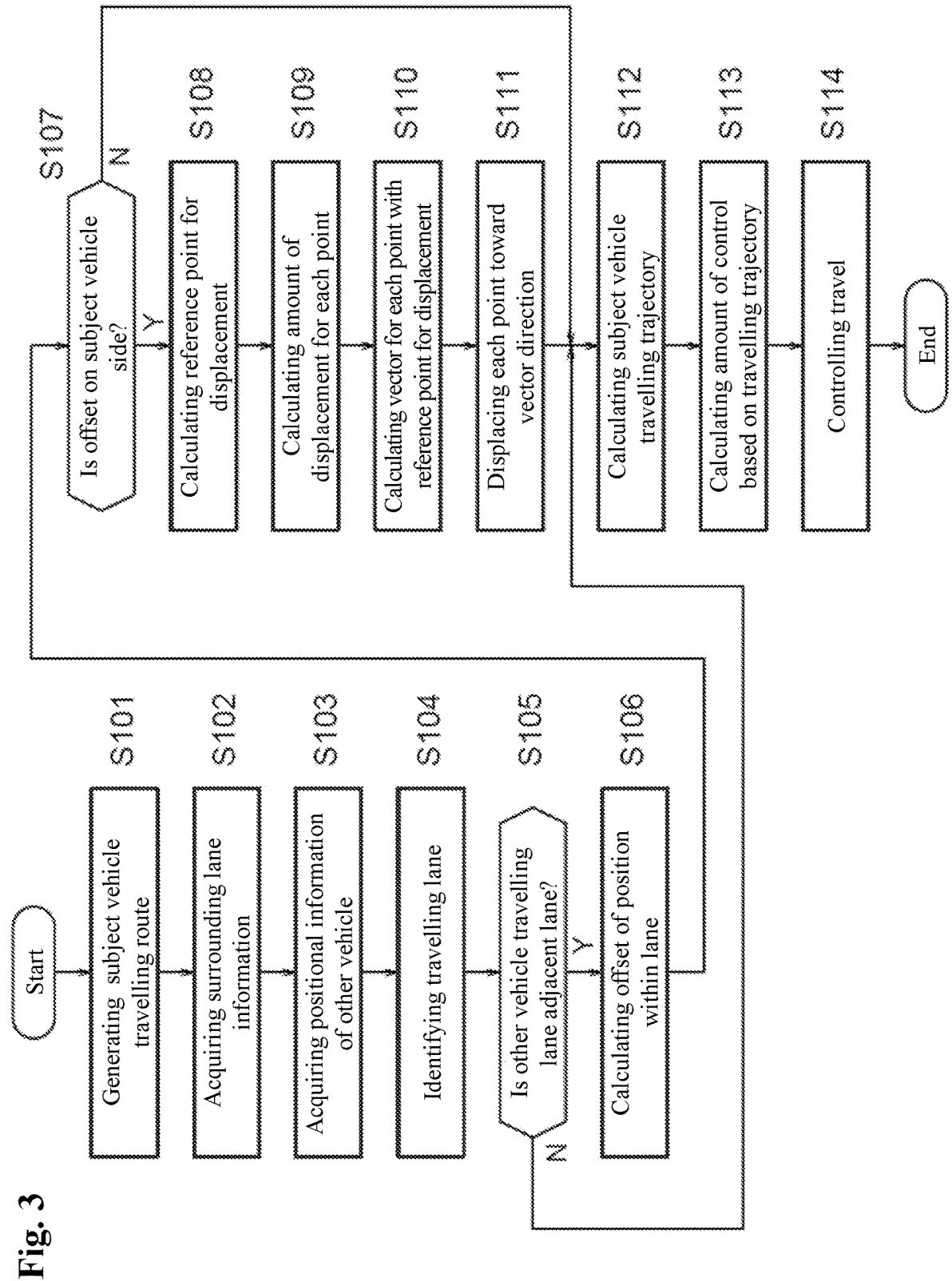
FIG. 3 is a flow chart of a control flow executed in the controlling device of FIG. 1.

FIG. 3 is a flowchart illustrating a flow of the control process of the present embodiment. The travel control process explained below is executed by the control device 180. Further, the travel control process explained below starts when the ignition switch or power switch is turned on and is executed repeatedly (e.g., every 10 milliseconds) at a predetermined cycle until the ignition switch or power switch is turned off.

The following explanation is based on an exemplary scene in which the autonomous travel control is input (turned on) by the driver. That is, the driver sets the autonomous travel control to on via the input device 160, thereby the autonomous travel control is executed so that the subject vehicle travels along the calculated travelling trajectory.

In a step S101, the control device 180 acquires the positional information of the subject vehicle detected by the subject vehicle position detecting device 110 and acquires the map information from the map database 120. Based on the positional information and the map information of the subject vehicle, the control device 180 identifies which lane the subject vehicle is travelling on the map and acquires information of the identified lane from the map information. In addition, the control device 180 generates the travelling route of the subject vehicle based on the acquired lane data and the positional information of the subject vehicle.

In a step S102, the control device 180 acquires lane information around subject vehicle based on the current positional information of subject vehicle and map information. The lane information is the information of lane boundary line and/or the information of center line of lane. The control device 180 may acquire lane information as region information enclosed by lines.

In a step S103, the control device 180 acquires positional information of other vehicles located around the subject vehicle by using the ranging sensor 140 and the like. The control device 180 acquires the positional information by using the ranging sensor 140. The control device 180 may also use, not limited to the ranging sensor 140, for example, an object recognition result by the camera 150, an object recognition result by the radar, or a clustering result by the lidar may to acquire the positional information. That is, the control device 180 detects the position of the other vehicle travelling on a lane, which is located in the vehicle width direction with respect to the subject vehicle, using the ranging sensor 140 and the like.

In a step S104, the control device 180 identifies which lane the other vehicle is traveling on the map based on the positional information of the other vehicle and the map information, and acquires information of the lane identified from the map information.

In a step S105, the control device 180 identifies which lane the other vehicle is traveling on the map based on the positional information of the other vehicle and the map information. The control device 180 determines whether the identified lane in which the other vehicle travels is an adjacent lane. The adjacent lane is a lane located on the right or left side of the travelling lane on which the subject vehicle is travelling.

When the travelling lane of the other vehicle is the adjacent lane, in a step S106, the control device 180 calculates an offset of the position of the other vehicle within the lane. The control device 180 acquires information of the adjacent lane (a lane located in the vehicle width direction with respect to the subject vehicle) from the map database 120. The adjacent lane is separated by the lane boundary lines. Information of the lane boundary line is indicated by a dot sequence. Each point included in the dot sequence is represented by a position coordinate on the map. A line connecting the consecutive position coordinates corresponds to the lane boundary lines. The lane boundary line represents the left and right boundaries of the adjacent lane respectively, and the center line of a pair of the lane boundary lines is the center line of the lane. In addition, the control device 180 calculates the travelling trajectory of the other vehicle from a temporal transition of the position coordinates of the other vehicle. Next, the control device 180 calculates a deviation (a delta of the position) between the travelling trajectory of the other vehicle and the center line of the lane. The deviation of the position is a deviation of in the width direction of the vehicle. For example, as shown in FIG. 2, when the other vehicle travels to the left according to a curved line, the width direction of the vehicle is a radial direction of a curvature radius. Thus, the control device 180 calculates the offset of the other vehicle. When the travelling lane of the other vehicle is not the adjacent lane, the control device 180 executes a step S112 of the control flow.

In a step S107, the control device 180 determines whether the offset is the subject vehicle side. The control device 180 calculates a direction of the offset in the position of the other vehicle within the lane by using positive and negative values. Then, the control device 180 determines whether the offset is in the subject vehicle side based on a relationship between the positive and negative of the offset and the current position of the subject vehicle. For example, in the example shown in FIG. 2, when the other vehicle travels outward with respect to the center line of the lane, the control device 180 calculates the offset so that the deviation of the position is a positive value. On the other hand, in FIG. 2, when the other vehicle travels inward with respect to the center line of the lane, the control device 180 calculates the offset so that the deviation of the position is negative. When the subject vehicle travels on a lane outside the travelling lane of the other vehicle, and the offset is a positive value, the control device 180 determines that the offset is on the subject vehicle side. The control device 180 determines that the offset is not the subject vehicle side when the subject vehicle travels a lane outside the travelling lane of the other vehicle and the offset is a negative value. When the subject vehicle travels on a lane inside the travelling lane of the other vehicle and the offset is a negative value, the control device 180 determines that the offset is on the subject vehicle side. The control device 180 determines that the offset is not on the subject vehicle side when the subject vehicle travels on a lane inside the travelling lane of the other vehicle, and the offset is a positive value.

When it is determined that the offset is on the subject vehicle side, in a step S108, the control device 180 calculates a reference point for displacement of the lane boundary line of the subject vehicle. When it is determined that there is no offset or when it is determined that the offset is not on the subject vehicle side, the control device 180 executes the step S112 of the control process. The reference point for displacement is used to define a direction of displacement (a correction direction) of the dot sequence indicating the lane boundary line. The reference point for displacement is set based on the shape of the travelling route. For example, as shown in FIG. 2, the control device 180 sets the reference point for displacement at the center of curvature of the curved lane boundary line when the travelling route of the subject vehicle is curved. When the travelling route of the subject vehicle is linear, the control device 180 sets the reference point for displacement at the current position of the subject vehicle or at a point on the travelling route of the subject vehicle.

Figure 4:
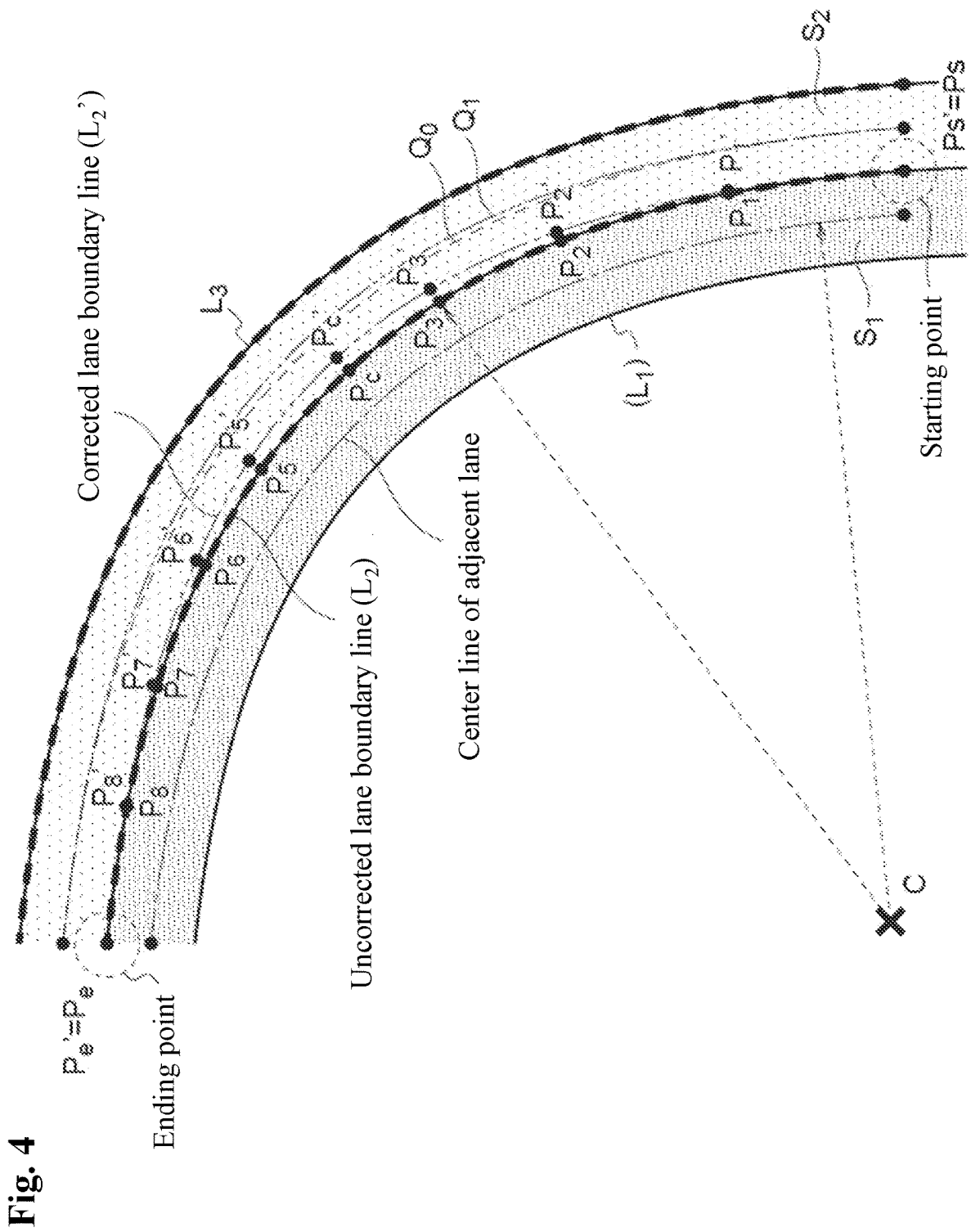
FIG. 4 is a conceptual diagram for explaining a center line of an adjacent lane and a border line of lane (lane boundary line) on which the subject vehicle travels.

Hereinafter, the steps S108 to S112 of the control process are explained referring to FIG. 2 and FIG. 4. FIG. 4 is a conceptual diagram for explaining the center line of the adjacent lane and the boundary line of the lane on which the subject vehicle travels (the lane boundary line). FIG. 4 corresponds to the scene of FIG. 2. The lane boundary line of the traveling route of the subject vehicle A shown in FIG. 2 corresponds to the lane boundary line shown in FIG. 4, and the center line of the lane in the traveling route of the other vehicle B shown in FIG. 2 corresponds to the adjacent center line shown in FIG. 4. The travelling route of the subject vehicle A is the part of the area $S_2$ shown in FIG. 4 that is the route separated by the uncorrected lane boundary line $L_2$ and the lane boundary line $L_3$. The travelling route of the other vehicle B is the part of the area $S_1$ shown in FIG. 4 in that is the route separated by the lane boundary line $L_1$ and the uncorrected lane boundary line $L_2$. Incidentally, information of the lane boundary line and the center line of the adjacent lane shown by the dotted line in FIG. 4 is included in the map information of the map database 102.

The control device 180 sets the point C shown in FIG. 4 as the reference point for displacement by executing the step S108 of the control flow. That is, as shown in FIG. 4, a circle center obtained by circle approximation of the center line C for displacement is the reference point for displacement.

In a step S109, the control device 180 calculates an amount of displacement for each point of the dot sequence representing the travelling trajectory of the subject vehicle. First, the control device 180 identifies a correction target region to correct the travelling trajectory of the subject vehicle based on the map information and/or the data detected by the sensors such as the ranging sensor 104. The control device 180 sets a region, such as within an intersection, on which no lane is drawn as the correction target region. The correction target region is not necessarily a region without a lane on the road surface, and may be a region in which it is difficult to detect a lane, or a region in which a lane is not detected in the captured image of the camera 150. Further, when it is difficult to detect a lane due to weather or the like, the control device 180 may set the circumference in front of the subject vehicle as the correction target region. In the examples of FIG. 2 and FIG. 4, the control device 180 sets the intersection to the correction target region. Incidentally, the correction target region is not necessarily set.

The control device 180 calculates a deviation between the traveling trajectory of the other vehicle and the center line of the lane in which the other vehicle travels in the correction target region based on the map information. The deviation is a deviation in a radial direction of a circle around the reference point for displacement C. The control device 180 calculates the deviation for each point of the dot sequence representing the travelling trajectory of the other vehicle. Further, the control device 180 sets the largest deviation of the deviations for each point calculated in the correction target region to a largest displacement distance ($D_{max}$).

The control device 180 identifies a starting point and an ending point of the lane boundary line of the subject vehicle travelling route in the correction target region. In the examples of FIG. 2 and FIG. 4, the subject vehicle travels straight toward the intersection, turns left within the intersection, and travels on a lane to which the subject vehicle enters after the left turning. At this time, the starting point of the travelling boundary line of the subject vehicle travelling route is set at the entrance of the intersection, and the ending point is set at the exit of the intersection. In the example of FIG. 4, the point $P_s$ is the starting point and the point $P_e$ is the ending point. In other words, the control device 180 sets the starting point and ending point respectively at the end of a region overlapping the subject vehicle travelling route in the correction target region. Further, the control device 180 sets a center point between the starting point and the ending point on the lane boundary line of the subject vehicle travelling route. The center point is set on the lane boundary line at the midpoint between the starting point and the ending point. Incidentally, the center point is not necessarily a midpoint. For example, when the lane boundary line is partially inflated with respect to a circle obtained by circle approximation around the center line for displacement C, at a position at which the radius is the largest with respect to the point C, the position may be set the as the center point. In the example of FIG. 4, the point $P_3$ is the center point.

The control device 180 calculates a function of the amount of displacement, such that the amount of displacement is zero at the starting point and the ending point, and the amount of displacement becomes maximum at the center point ($D_{max}$).

Figure 5:
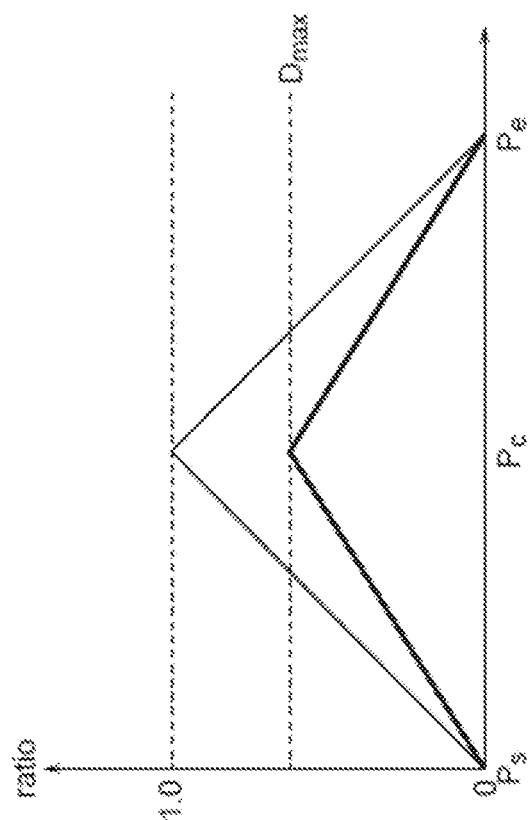
FIG. 5 is a graph showing ratios of amounts of displacement with respect to points on the lane boundary line.

FIG. 5 is a graph representing a ratio of the amount of displacement relative to the points on the lane boundary line. In the graph shown in FIG. 5, the horizontal axis indicates a position on the lane boundary line, the vertical axis indicates the ratio of the displacement. The ratio of displacement is zero at the starting point, increases proportionally from the starting point toward the midpoint, and peaks at the midpoint (1.0). The ratio of displacement then decreases proportionally from the midpoint toward the ending point and becomes zero at the ending point.

The control device 180 calculates the amount of displacement ($d(i)$) for each point of the lane boundary line which indicates the subject vehicle travelling route by using the relation of the ratio of the amount of displacement as shown in FIG. 5, according to the following equation (1).

$$d(i)=D_{max} \times \mathrm{ratio}(i) \qquad (1)$$

Incidentally, "i" represents an order of the points to be plotted for each predetermined distance or predetermined calculation period on the lane boundary line. A point at which "i" is equal to 0 becomes the starting point, and "i" increases toward the ending point in natural numbers.

In a step S110, the control device 180 calculates a vector (V (i)) for each point from the center point of displacement C toward each point of the dot sequence indicating the lane boundary line of the subject vehicle. In the example of FIG. 4, the control device 180 calculates the vector V(i) with the length of d(i) from the center point for displacement C toward each point on the lane boundary line ($P_s$, $P_1$ ... $P_8$, $P_e$).

In a step S111, the control device 180 displaces each point on the lane boundary line ($P_s$, $P_1$ ... $P_8$, $P_e$) according to the corresponding vector V(i). In the example of FIG. 4, the control device 180 calculates vector P'(i) toward each point after displacement (after correction) ($P'_s$, $P'_1$ ... $P'_8$, $P'_e$) by adding the vector (i) to the vector P(i) toward each point ($P_s$, $P_1$ ... $P_8$, $P_e$) from the center point of displacement C, as shown in the following equation (2).

$$P'(i)=P(i)+V(i) \qquad (2)$$

A line connecting the points after displacement (after correction) ($P'_s$, $P'_1$ ... $P'_8$, $P'_e$) becomes the corrected border line $L_2'$ for the subject vehicle. As shown in FIG. 4, the corrected lane boundary line passes through the starting point ($P_s$) and the ending point ($P_e$).

When it is determined in the step S106 that the travelling lane of the other vehicle is not the adjacent lane, and when it is determined in the step S107 that the offset does not exist or it is determined that the offset is not on the subject vehicle, in the step S112, the control device 180 calculates the travelling trajectory of the subject vehicle based on the lane boundary line of the subject vehicle travelling route. On the other hand, when it is determined in the step S107 that the offset is on the subject vehicle side, in the step S112, the control device 180 corrects the travelling trajectory of the subject vehicle based on the corrected lane boundary line. In the example of FIG. 4, the control device 180 calculates the center line $Q_0$ between the uncorrected left-side lane boundary line $L_2$ and the right-side lane boundary line as the travelling trajectory of the subject vehicle, relative to the direction that the subject vehicle travels. On the other hand, the control device 180 calculates the center line $Q_1$ between the corrected left-side lane boundary line and the right-side lane boundary line as the corrected travelling trajectory of the subject vehicle. In the example of FIG. 4, the left-side lane boundary line is corrected to be away from the other vehicle, however, the right-side lane boundary line is not corrected. Therefore, a travelable region of the subject vehicle defined by a pair of the lane boundary lines is reduced in the width direction of the vehicle in accordance with the magnitude of the offset. The travelable region defines a route that the subject vehicle can travel as a region and corresponds to the route separated by the corrected lane boundary line $L_2'$ and the uncorrected lane boundary line $L_3$. The center line of the corrected travelable region (a line along the direction that the subject vehicle travel) is the travelling trajectory $Q_1$ of the subject vehicle. This travelling trajectory is a target trajectory when the subject vehicle travels on the subject vehicle travelling route.

In the example of FIG. 4, the control device 180 may calculate a line moved outward for a predetermined length with respect to the corrected lane boundary line, as the travelling trajectory of the subject vehicle.

In the example of FIG. 4, the control device 180 may correct the right-side lane boundary line, in addition to the correction for the left-side lane boundary line, and may calculate the center line of the pair of the corrected lane boundary lines as the travelling trajectory of the subject vehicle. The right-side lane boundary line may be corrected in the same manner as the control flow described in the steps of S108 to S111. Thus, when one of the lane boundary line is corrected to reduce the length of the travelable region of the subject vehicle in the vehicle-width direction, the control device 180 may correct the other lane boundary line to widen a region (outer region in the example of FIG. 4) located opposite to the reduced region (inner region in the example of FIG. 4) of the travelable region. The center line of the corrected travelable region (along the direction that the subject vehicle travels) becomes the travelling trajectory of the subject vehicle. This ensures to secure the travelable region. Incidentally, the travelling trajectory of the subject vehicle is not necessarily the center line of the travelable region and may be calculated within the travelable region.

In a step S113, the control device 180 calculates an amount of control of the steering actuator and the like so that the target trajectory when the subject vehicle travels on the subject vehicle travelling route becomes the travelling trajectory calculated in the control process of the step S112.

In a step S114, the control device 180 executes the travel control of the subject vehicle by controlling the drive mechanism 170 with the calculated amount of control. Then, the control flow shown in FIG. 3 ends. As described above, in the present embodiment, when it is determined that the other vehicle travels to approach the subject vehicle that travels in parallel with the other vehicle at the intersection and the like in which the lane boundary line is not clearly drawn, the travelling trajectory of the subject vehicle is corrected so as to be away from the other vehicle, so that it is possible to inhibit a case in which a distance between the subject vehicle and the other vehicle in the vehicle-width direction is shortened.

As described above, in the present embodiment, the travelling route of the subject vehicle is corrected by: generating the subject vehicle travelling route based on the map information; calculating the travelling trajectory of the subject vehicle to be the target trajectory when the subject vehicle travels on the subject vehicle travelling route; detecting the position of the other vehicle travelling the lane located in the width direction of the subject vehicle by the sensor; calculating the offset of the position of the other vehicle in the lane on which the other vehicle travels based on the position of the other vehicle; and correcting the travelling trajectory of the subject vehicle in accordance with the calculated offset. This allows the travelling trajectory to be properly corrected under the circumstances when no segment line (lane boundary line) is drawn on the road surface or when the segment line is not properly detected. Further, for example, when the position of the other vehicle travelling on the adjacent lane approaches the position of the subject vehicle, the travelling trajectory that the subject vehicle moves away from the other vehicle can be calculated.

In the present embodiment, the subject vehicle travelling route is generated based on the information of the lane boundary line included in the map information or the information of the travelling region included in the map information. This allows the travelling trajectory of the subject vehicle to be calculated within the region including the subject vehicle travelling route.

In the present embodiment, the travelling trajectory of the other vehicle is calculated by using the data detected by the sensor, and the offset is calculated based on the travelling trajectory of the other vehicle. This enables to calculate the offset of the other vehicle at a certain point and a history of the offset, so that accuracy of calculation in calculating the offset of the position of the other vehicle is improved.

In the present embodiment, the other vehicle lane is identified based on the map information, and at least one of the deviation for the center of the lane of the other vehicle lane and the deviation for the lane boundary of the other vehicle lane is calculated as the deviation of the position of the other vehicle. This allows to improve accuracy in calculating the offset of the position of the other vehicle.

Further, in the present embodiment, based on at least one of the map information and the data detected by the sensor, the correction target region for correcting the travelling trajectory is set, and set either the starting point or the ending point of the region overlapping the subject vehicle travelling route in the correction target region as the fixed point. The corrected travelling trajectory of the subject vehicle passes through the fixed point. By fixing the end points of region in the region of which boundary is not clear, it is possible to inhibit a deviation of the travelling trajectory at the end point of the section. That is, continuity of the travelling trajectory can be maintained before and after the correction target region.

In this embodiment, the travelling trajectory of the subject vehicle is corrected in the width direction of the subject vehicle. This allows the travelling trajectory of the subject vehicle to be corrected for the entire section in a section in which the lane boundary line is not clear.

In the present embodiment, the other vehicle lane is identified based on the map information, and whether the position of the other vehicle is offset to the subject vehicle side in the other vehicle lane is determined. When it is determined that the position of the other vehicle is offset to the subject vehicle side, the travelable region is corrected so that the travelable region in the subject vehicle travelling route decreases in accordance with the magnitude of the offset. This enables to calculate the travelling trajectory so that the subject vehicle moves away from the other vehicle when the position of the other vehicle travels on the adjacent lane approaches the subject vehicle.

In the present embodiment, the center line of the corrected travelable region is calculated as the travelling trajectory of the subject vehicle. In the present embodiment, the travelling trajectory of the subject vehicle may be calculated within the corrected travelable region. This enables to calculate the travelling trajectory so that the subject vehicle moves away from the other vehicle, for example, when the position of the other vehicle travels on the adjacent lane approaches the subject vehicle side.

In the present embodiment, the upper limit value may be set for the amount of displacement. For example, the upper limit value is preset for the maximum amount of displacement ($D_{max}$). The control device 180 calculates a deviation for each point of the dot sequence indicating the travelling trajectory of the other vehicle by the control process of the step S109, and calculates the maximum deviation that is the largest of the deviations calculated for each point. With regard to the correspondence between the maximum deviation and the maximum amount of displacement ($D_{max}$), the larger the maximum deviation is, the larger the maximum amount of displacement ($D_{max}$) becomes. The control device 180 calculates the maximum amount of displacement ($D_{max}$) corresponding to the maximum deviation and compares the maximum amount of displacement ($D_{max}$) with the upper limit value. When the maximum amount of displacement ($D_{max}$) is greater than the upper limit value, the control device 180 limits the maximum amount of displacement ($D_{max}$) to the upper limit value. The control device 180 uses the limited maximum amount of displacement ($D_{max}$) in the equation (1). This inhibits the travelable region of the subject vehicle to be too narrow since the upper limit value is provided for an amount of correction of the travelling trajectory of the subject vehicle.

In this embodiment, when the travelable region is reduced in the width direction of the vehicle by correcting the travelling trajectory of the subject vehicle, and the length of the corrected travelable region in the width direction of the vehicle is shorter than the width of the subject vehicle, the control device 180 may widen the region located on the opposite side of the reduced region in the vehicle width direction in the travelable region. This ensures to secure the travelable region of the subject vehicle.

In the present embodiment, the travelling trajectory of the other vehicle is not necessarily calculated when the offset of the position of the other vehicle is calculated by the offset calculation function, and in the steps S106 and S107 of the control flow. The control device 180 calculates the distance between the position of the other vehicle detected by the ranging sensor 104 or the camera 105 and the position of the lane boundary line. The distance is the length in the width direction of the vehicle. The control device 180 calculates the offset of the position of the other vehicle by identifying the width of the other vehicle lane from the map information and comparing the magnitude of the width with the calculated distance. As an example, the control device 180 sets the right-side lane boundary line of a pair of the lane boundary lines of the other vehicle as a reference line. The control device 180 calculates the distance from the reference line to the position of the other vehicle. The shorter the calculated distance is, the farther the position of the other vehicle is shifted to the right-side lane boundary line. When the calculated distance is about half the width of the lane, the position of the other vehicle is around the center line of the lane. The longer the calculated distance is, the farther the position of the other vehicle is shifted to the left-side lane boundary line. In this wise, the control device 180 can calculate the distance to the position in the vehicle width direction of the other vehicle by using the lane boundary line as the reference line, and calculates the offset of the position of the other vehicle in the other vehicle lane in accordance with the calculated distance. Incidentally, the reference line may be the left-side lane boundary line, or the center line of the lane.

In a modification of the present embodiment, the amount of displacement may be calculated in accordance with the deviation calculated in a predetermined period in time with the calculation period, without setting the functional expression of the amount of displacement in the correction target region. For example, the correspondence between the magnitude of the deviation and the magnitude of the amount of displacement is determined in advance, and the control device 180 stores the correspondence as a table. In the example of FIG. 4, the control device 180 calculates the deviation at each point from the point ($P_s$) to the point ($P_e$) on the lane boundary line, and calculates the amount of displacement in accordance with the deviation calculated by referring to the table, respectively. In addition, the control device 180 corrects the travelling trajectory of the subject vehicle in accordance with the calculated amount of displacement. In this wise, for example, when the deviation changes in the correction target region, the amount of displacement also changes in accordance with the change in deviation, and the corrected travelling trajectory also changes. That is, in the present embodiment, the travelable region is corrected so that the travelable region in subject vehicle travelling route is extended when the magnitude of the offset decreases after the travelable region in the subject vehicle travelling route decreases in accordance with the magnitude of the offset. In this wise, when the deviation becomes smaller after correcting the travelling trajectory, the travelling route of the subject vehicle can be made closer to the original shape by reducing the amount of correction for the travelable region.

In the above modification, the magnitude of the travelable region is changed by correcting the travelling trajectory in accordance with the change in the deviation, however, the size of travelable region may be maintained for a predetermined period after correcting the travelable region. The predetermined period is, for example, the time that the subject vehicle travels the correction target region. This enables to inhibit the change of the travelable region after correction.

In the modification of the present embodiment, in the step S113 and step S114 of the control process, the control device 180 may reduce a vehicle speed of the subject vehicle slower than the current vehicle speed when the length of the corrected travelable region in the vehicle width direction is shorter than the width of the subject vehicle. In this wise, it is possible to inhibit the subject vehicle from approaching the other vehicle by decreasing the vehicle speed of the subject vehicle.

The control process of the control device according to the present embodiment may be executed not only when the current position of the subject vehicle and/or the current position of the other vehicle are included in the correction target region, but also when the current position of the subject vehicle and/or the current position of the other vehicle are out of the correction target region, for example, when the subject vehicle is approaching the correction target region. For example, in the example of FIG. 2, when the subject vehicle is approaching the intersection, the control device 180 calculates the position of the other vehicle located on the lane of the subject vehicle, and calculates the deviation with respect to the position of the other vehicle. Then, the control device 180 calculates the amount of displacement with respect to the calculated deviation. The control device 180 further corrects the travelling trajectory of the subject vehicle within the correction target region by using the calculated amount of displacement.

Second Embodiment

The travel controlling device 100 and travel controlling method according to other embodiment of the present invention is explained. In the present embodiment, with respect to the first embodiment, it differs in that the amount of displacement for each point of the dot sequence indicating the travelling trajectory of the subject vehicle is a constant value. The other features of the travel controlling device 100 and the control process of the control device 180 are the same as those of the first embodiment. The description of the first embodiment is incorporated as appropriate.

Figure 6:
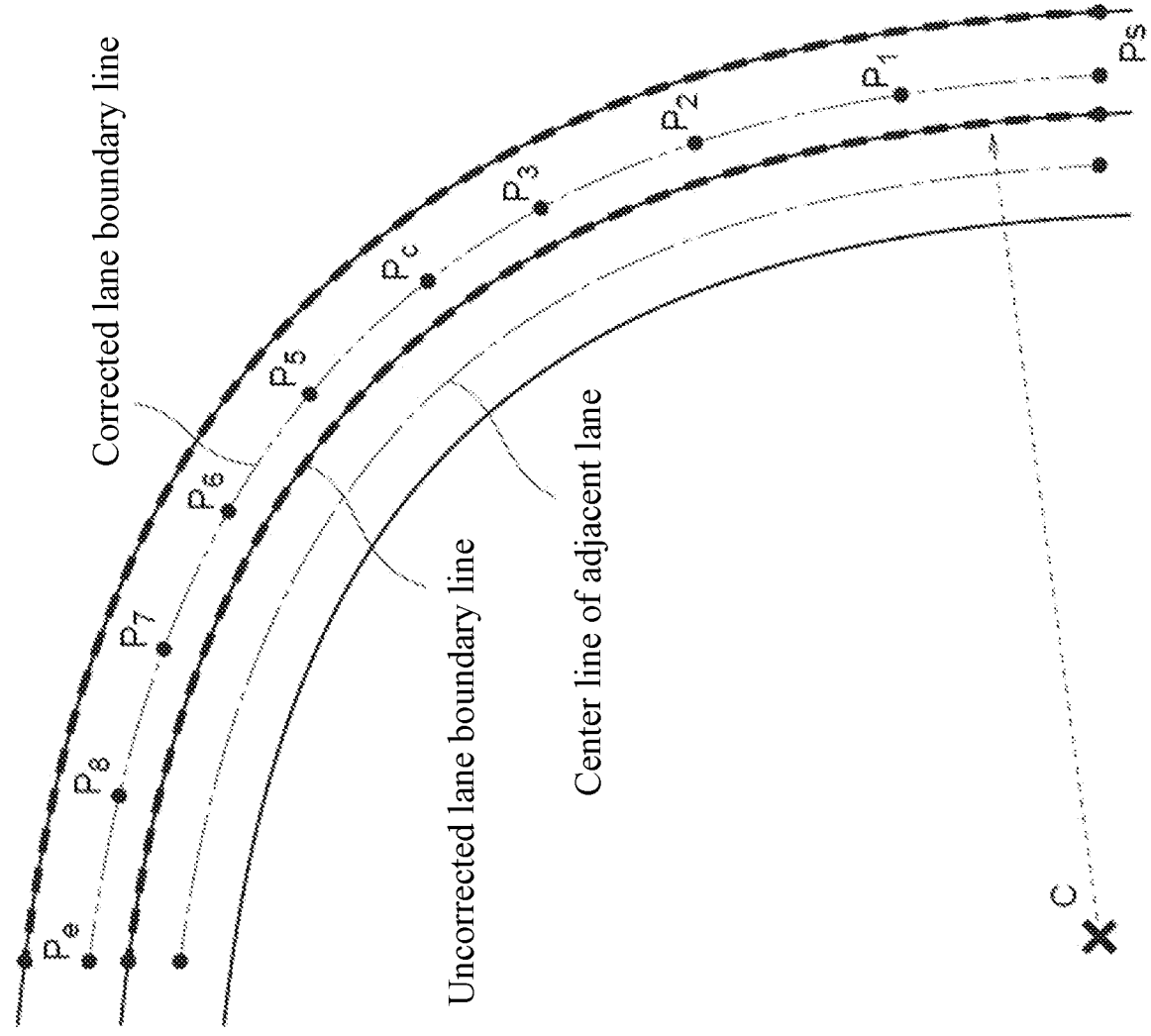
FIG. 6 is a conceptual diagram for explaining a center line of an adjacent lane and a border line of lane (lane boundary line) on which the subject vehicle travels.

The control device 180 executes the following control process instead of the step S109 of the control process of the first embodiment. The other control processes are the same as those of the first embodiment. Hereinafter, the control process is explained with reference to FIG. 2 and FIG. 6. FIG. 6 is a conceptual diagram for explaining the center line of the adjacent lane and the border line (the lane boundary line) of the lane on which the subject vehicle travel and corresponds to the scene of FIG. 2. The lane boundary line of the traveling route of the subject vehicle A shown in FIG. 2 corresponds to the lane boundary line before correction shown in FIG. 6, and the center line of the lane in the traveling route of the other vehicle B shown in FIG. 2 corresponds to the center line of the adjacent lane shown in FIG. 6. Incidentally, information of the lane boundary line and the center line of the adjacent lane shown by the dotted lines in FIG. 6 is included in the map information of the map database 102.

First, the control device 180 identifies the correction target region to correct the travelling trajectory of the subject vehicle based on the map information and/or the data detected by the sensor such as the ranging sensor 104. Since the identification of the correction target region is the same as that of the first embodiment, the explanation thereof is omitted.

The control device 180 calculates the deviation between the travelling trajectory of the other vehicle and the center line of the other vehicle lane in the correction target region based on the map information. At this time, the deviation is calculated as a constant value. The constant deviation is, for example, the average value, maximum value, or the minimum value of the deviation for each point of the dot sequence representing the travelling trajectory of the other vehicle. The control device 180 calculates a constant amount of displacement (an offset value) corresponding to the constant deviation. The relationship between the deviation and the amount of displacement is preset. The larger the deviation is, the larger the constant amount of displacement becomes. Incidentally, the upper limit value may be set for the constant amount of displacement. The upper limit value may be set in accordance with, for example, lane widths.

The control device 180 identifies the starting point and the ending point of the lane boundary line of the subject vehicle travelling route in the correction target region. Since the identification of the starting point and ending point of the lane boundary line is the same as that of the first embodiment, the description thereof is omitted. Next, the control device 180 sets the ratio of displacement from the starting point to the ending point to a fixed value (1.0) and sets the amount of displacement of the respective points P(i) to a constant value.

Figure 7:
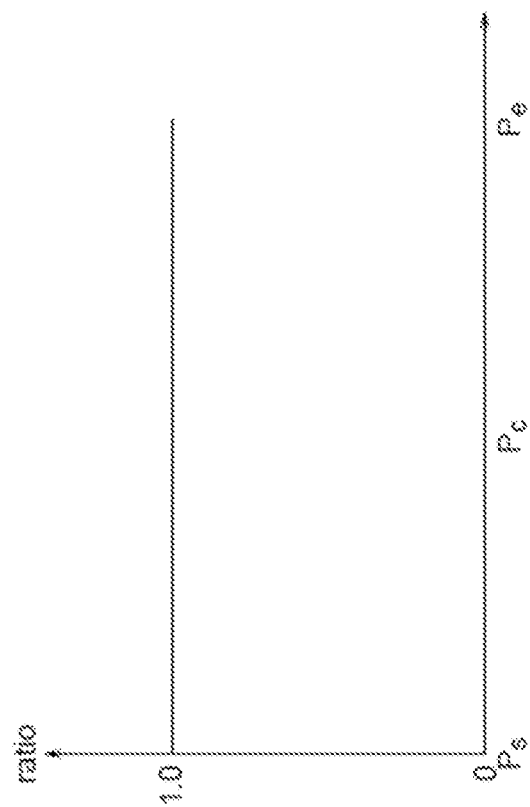
FIG. 7 is a graph showing ratios of amounts of displacement with respect to points on the lane boundary line.

FIG. 7 is a graph representing the ratio of the amount of displacement relative to the point on the lane boundary line. In the graph shown in FIG. 5, the horizontal axis indicates the position on the lane boundary line, and the vertical axis indicates the ratio of the amount of displacement. The ratio of the amount of displacement is fixed at 1.0.

Then, the control device 180 corrects the travelling trajectory of the subject vehicle by using the calculated amount of displacement. As shown in FIG. 6, the corrected lane boundary line is offset outward by the certain amount of displacement relative to the uncorrected lane boundary line (the lane boundary line indicated by the map information). As described above, in the present embodiment, when it is determined that the other vehicle travels to approach the subject vehicle in a state where the subject vehicle and the other vehicle travel side by side at an intersection and the like in which the lane boundary line is not clearly shown, the corrected lane boundary line is calculated by offsetting the uncorrected lane boundary line by a certain amount of displacement to the outside. Then, based on the corrected lane boundary line, the traveling route of the subject vehicle is entirely corrected to move away from the other vehicles. This can inhibit the distance between the subject vehicle and the other vehicle in the vehicle width direction from being shortened.

As described above, in the present embodiment, the travelling trajectory of the subject vehicle is corrected as the offset is assumed to be the constant value within the correction target region. In this wise, it is possible to inhibit sharp changes in the travelling trajectory is inhibited with respect to a variation of the deviation.

DESCRIPTION OF REFERENCE NUMERALS

100 Travel controlling device
110 Subject vehicle position detecting device
120 Map database
130 Vehicle speed sensor
140 Ranging sensor
150 Camera
160 Input device
170 Drive mechanism
180 Control device
190 Yaw rate sensor

The invention claimed is:

1. A method for correcting a travelling trajectory of a vehicle which is executed by a control device having a function for realizing a correction of the traveling trajectory when detecting a lane by a sensor provided for a subject vehicle is impossible or difficult, the method comprising:
   acquiring map information including lane information from a database;
   calculating a travelling trajectory of the subject vehicle to be a target trajectory when the subject vehicle travels on a subject vehicle travelling route based on the lane information;
   detecting a position of another vehicle located in a vehicle width direction of the subject vehicle by the sensor;
   calculating an offset of the position of the other vehicle in the vehicle width direction in an adjacent lane that the other vehicle travels based on the position of the other vehicle and the lane information; and
   correcting the travelling trajectory of the subject vehicle in accordance with the offset.

2. The method for correcting a travelling trajectory of claim 1, wherein the subject vehicle travelling route is generated based on information of a track boundary included in the map information; or information of a travelling region included in the map information.

3. The method for correcting a travelling trajectory of claim 1, further comprising:
   calculating a travelling trajectory of the other vehicle when the other vehicle travels on the other vehicle lane with data detected by the sensor; and
   calculating the offset based on the travelling trajectory of the other vehicle.

4. The method for correcting a travelling trajectory of claim 1, further comprising:
   identifying the other vehicle lane based on the map information; and
   calculating at least one of a deviation of the other vehicle lane against a center of the lane and a deviation of the other vehicle lane against a lane boundary as the offset.

5. The method for correcting a travelling trajectory of claim 1, further comprising:
   setting a correction target region for correcting the travelling trajectory of the subject vehicle based on at least one of the map information and data detected by the sensor;
   calculating the offset of the position of the other vehicle in the correction target region based on the position of the other vehicle; and
   correcting the travelling trajectory of the subject vehicle in accordance with the offset of the other vehicle in the correction target region.

6. The method for correcting a travelling trajectory of claim 1, further comprising:
setting a correction target region for correcting the travelling trajectory of the subject vehicle based on at least one of the map information and data detected by the sensor; and
correcting the travelling trajectory of the subject vehicle assuming that the offset is a constant value within the correction target region.

7. The method for correcting a travelling trajectory of claim 1, further comprising:
setting a correction target region for correcting the travelling trajectory of the subject vehicle based on at least one of the map information and data detected by the sensor; and
setting either a starting point or an ending point of a region of the correction target region that overlaps the subject vehicle travelling route as a fixed point,
wherein the corrected travelling trajectory of the subject vehicle passes the fixed point.

8. The method for correcting a travelling trajectory of claim 1, wherein the travelling trajectory of the subject vehicle is corrected toward the vehicle width direction of the subject vehicle.

9. The method for correcting a travelling trajectory of claim 8, wherein an upper limit value is set for an amount of correction towards the vehicle width direction.

10. The method for correcting a travelling trajectory of claim 1, further comprising:
identifying the other vehicle lane based on the map information;
determining whether the position of the other vehicle is deflected toward a subject vehicle side in the other vehicle lane based on the offset; and
when a determination is made that the position of the other vehicle is deflected toward the subject vehicle side in the other vehicle lane, correcting a travelable region so that the travelable region in the subject vehicle travelling route decreases in accordance with a magnitude of the offset.

11. The method for correcting a travelling trajectory of claim 10, further comprising:
calculating a center line of the corrected travelable region as the travelling trajectory of the subject vehicle.

12. The method for correcting a travelling trajectory of claim 10, further comprising:
calculating the travelling trajectory of the subject vehicle within the corrected travelable region.

13. The method for correcting a travelling trajectory of claim 10, further comprising:
correcting the travelable region so that the travelable region in the subject vehicle travelling route decreases in the vehicle width direction of the subject vehicle in accordance with the magnitude of the offset; and
when a length of the corrected travelable region in the vehicle width direction is shorter than a width of the subject vehicle, extending a region in the travelable region that is located on an opposite side of the decreased travelable region in the vehicle width direction.

14. The method for correcting a travelling trajectory of claim 10, further comprising:
when the magnitude of the offset becomes small after the travelable region in the subject vehicle travelling route decreases in accordance with the magnitude of the offset, correcting the travelable region so that the travelable region in the subject vehicle travelling route expands.

15. The method for correcting a travelling trajectory of claim 10, wherein a size of the corrected travelable region is maintained for a predetermined time.

16. The method for correcting a travelling trajectory of claim 10, further comprising decreasing a speed of the subject vehicle when a width of the corrected travelable region is shorter than a width of the subject vehicle.

17. A device for correcting a travelling trajectory of a vehicle having a control device, the control device having a function for realizing a correction of the traveling trajectory when detecting a lane by a sensor provided for a subject vehicle is impossible or difficult, wherein the control device is configured to:
acquire map information including lane information from a database;
calculate a travelling trajectory of the subject vehicle to be a target trajectory when the subject vehicle travels on the subject vehicle travelling route based on the lane information;
detect a position of another vehicle located in a vehicle width direction of the subject vehicle by the sensor;
calculate an offset of the position of the other vehicle in the vehicle width direction in an adjacent lane that the other vehicle travels based on the position of the other vehicle and the lane information; and
correct the travelling trajectory of the subject vehicle in accordance with the offset.

\* \* \* \* \*